US008066789B2

(12) United States Patent
Liu et al.

(10) Patent No.: US 8,066,789 B2
(45) Date of Patent: Nov. 29, 2011

(54) CONTINUOUS FINE ASH DEPRESSURIZATION SYSTEM

(75) Inventors: Guohai Liu, Birmingham, AL (US); Wan Wang Peng, Birmingham, AL (US); Pannalal Vimalchand, Birmingham, AL (US)

(73) Assignee: Southern Company, Birmingham, AL (US)

( * ) Notice: Subject to any disclaimer, the term of this patent is extended or adjusted under 35 U.S.C. 154(b) by 457 days.

(21) Appl. No.: 12/426,669

(22) Filed: Apr. 20, 2009

(65) Prior Publication Data
US 2010/0263342 A1 Oct. 21, 2010

(51) Int. Cl.
*B01D 46/32* (2006.01)
(52) U.S. Cl. ........... 55/474; 55/476; 55/473; 55/315.1; 55/428; 55/315; 55/315.2; 55/318; 55/319; 55/512; 95/271; 95/29; 96/389
(58) Field of Classification Search .......... 55/474, 55/467, 473, 447, 428, 315, 315.1, 315.2, 55/318, 319, 512; 95/271, 29; 96/389
See application file for complete search history.

(56) References Cited

U.S. PATENT DOCUMENTS

| 3,243,164 | A | * | 3/1966 | Von Gustorf et al. | ......... 366/262 |
| 3,544,540 | A | * | 12/1970 | Houser et al. | ................. 528/498 |
| 3,671,185 | A | * | 6/1972 | Lefrancois et al. | ........ 423/210.5 |
| 3,728,866 | A | * | 4/1973 | Layton | .............................. 62/126 |
| 3,737,285 | A | * | 6/1973 | Hicks, Jr. | ....................... 422/111 |
| 4,443,321 | A | * | 4/1984 | Compton | ...................... 208/435 |
| 4,898,107 | A | * | 2/1990 | Dickinson | ..................... 110/346 |
| 5,342,920 | A | * | 8/1994 | Imai et al. | ..................... 528/388 |
| 2011/0028665 | A1 | * | 2/2011 | Eriksson et al. | ................ 526/90 |

\* cited by examiner

*Primary Examiner* — Jason M Greene
*Assistant Examiner* — Dung H Bui
(74) *Attorney, Agent, or Firm* — Ryan A. Schneider, Esq.; Troutman Sanders LLP

(57) ABSTRACT

A system for depressurizing and cooling a high pressure, high temperature fine solid particles stream having entrained gas therein. In one aspect, the system has an apparatus for cooling the high pressure, high temperature fine solid particles stream having entrained gas therein and a pressure letdown device for depressurization by separating the cooled fine solid particles from a portion of the fine solid particles stream having entrained gas therein, resulting in a lower temperature, lower pressure outlet of solid particles for disposal or handling by downstream equipment.

21 Claims, 6 Drawing Sheets

CONTINUOUS FINE ASH DEPRESSURIZATION SYSTEM

ACKNOWLEDGMENT

This invention was made with some government support under Cooperative Agreement Number DE-FC21-90MC25140 awarded by the United States Department of Energy. The United States government has certain rights in the invention.

FIELD OF THE INVENTION

This invention relates generally to discharge of particulate matters from fluidized bed combustion or gasification systems and particularly to the cooling and depressurization of fine particles from high pressure and high temperature streams from fluidized bed combustion or gasification systems.

BACKGROUND OF THE INVENTION

Operating a pressurized reactor such as a fluidized bed coal gasifier or combustor involves discharging fine particles under high pressure and temperatures to storage bins under atmospheric pressure and low temperature (i.e., below 350° F.). The most commonly used method in such systems is a combination of a lock vessel and a screw cooler system. The screw cooler receives solids under high pressure and temperature and cools the solids by contacting them with the screw and the inner surface of the container.

In this conventional system, the lock vessel typically is a pressure swing vessel and has inlet and outlet valves. The lock vessel receives the cooled solids under pressure from the screw cooler through a normally open inlet valve. When the predetermined amount of solids enters the lock vessel, the inlet valve is closed and the vessel is subsequently depressurized to almost atmospheric pressure. The bottom discharge valve is then opened to discharge the solids to an atmospheric vessel. The solids in the atmospheric vessel can be disposed to proper storage vessels.

However, there are numerous disadvantages to the conventional system. One inherent disadvantage of this system is the number of moving parts which need to cycle often and operate in a synchronous manner. A second disadvantage is the difficulty in sealing the two ends of the shaft of the screw when the shaft is rotating under high pressure. Additionally, there are number of valves around the lock vessel, and the reliability of these valves can be less than desired because during each cycle, the valves must open and close in dusty environment. In normal operating conditions, the valves selectively are opened and closed millions of times under high pressure with a rapid flow of solid particles, thereby eroding the valves. Thus, conventional commercially available systems can have availabilities on average of less than 70%.

What is needed then is a system for cooling and continuously depressurizing the fine particles without the inherent issues mentioned above.

SUMMARY OF THE INVENTION

The invention relates to a depressurization system in fluid communication with a high pressure, high temperature fine solid particles stream having entrained gas therein, such as for example, a fly ash stream from a gasification system. In one aspect, the system comprises an apparatus for cooling the high pressure, high temperature fine solid particles stream and a pressure letdown device (i.e., a separator) for depressurizing the cooled fine solid particles.

In one aspect, the pressure letdown device has a housing defining an interior separator cavity and having a housing wall and a filter within the interior separator cavity. In another aspect, the filter can have an inner wall and a spaced outer wall, the outer wall being spaced therefrom the housing wall and defining an enclosed annulus between the filter and the housing wall. In this aspect, the inner wall defines a conduit in fluid communication with the high pressure, lower temperature fine solid particles stream. The filter can be configured to allow at least a portion of the cooled fine particles to pass therethrough the conduit and exit via a solids outlet positioned adjacent a distal end of the conduit, while at least a portion of the gas entrained therein the high pressure fine solid particles stream can be directed to a gas outlet, which results in a lower pressure outlet for the cooled fine particles.

BRIEF DESCRIPTION OF THE DRAWINGS

These and other features of the preferred embodiments of the invention will become more apparent in the detailed description in which reference is made to the appended drawings wherein.

DETAILED DESCRIPTION OF THE INVENTION

Figure 1:
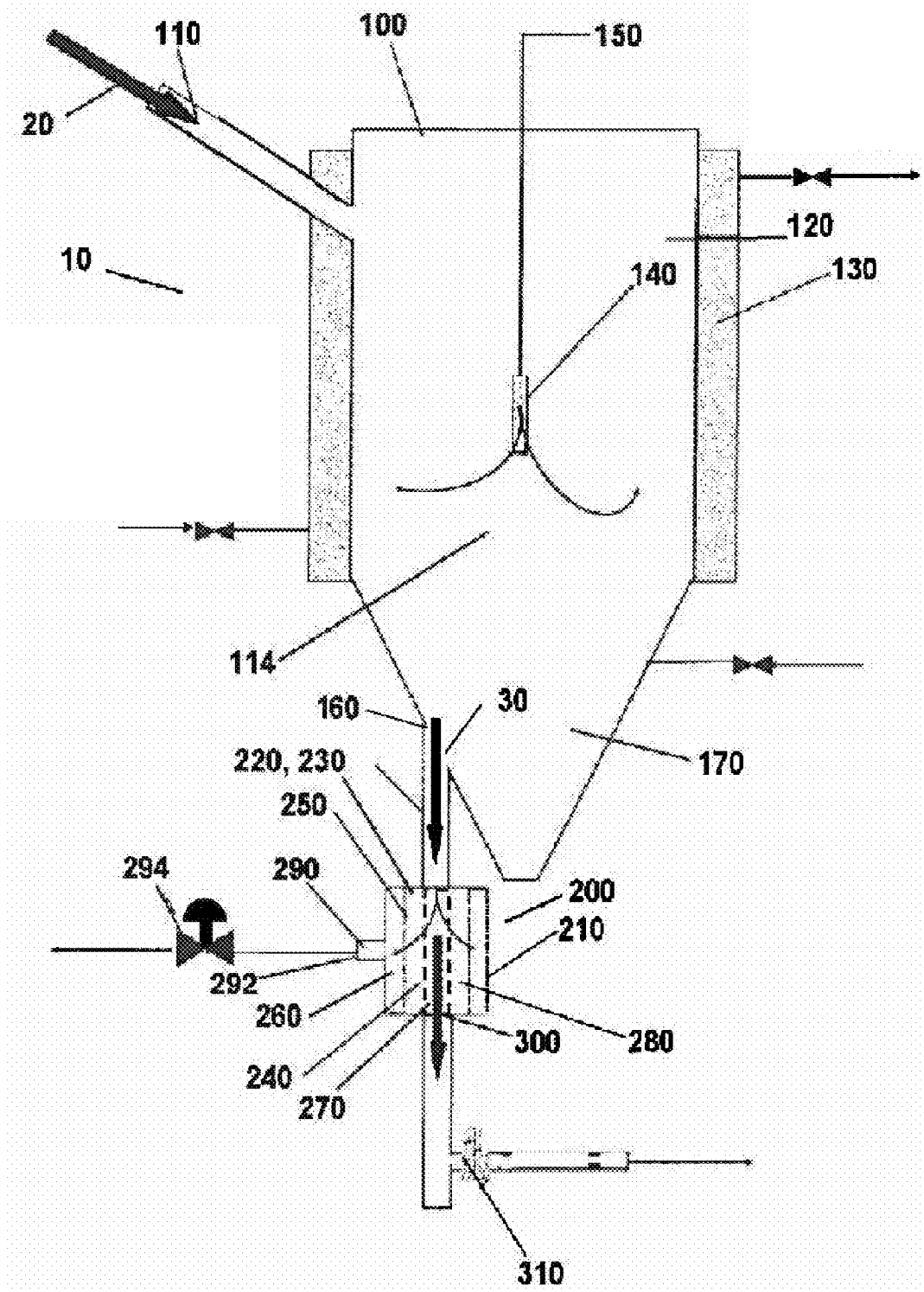
FIG. 1 is a schematic view of one embodiment of a depressurization system of the current application.

The present invention can be understood more readily by reference to the following detailed description, examples, drawing, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to "a valve" can include two or more such valves unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

As used herein, the term "high pressure" means a pressure at about 30 psig or above.

As used herein, the term "high temperature" means a temperature at about 200° C. or above.

The term "fine particles" means particles having a mean diameter less than or equal to 40 microns.

Reference will now be made in detail to the present preferred embodiment(s) of the invention, examples of which are illustrated in the accompanying drawings. Wherever possible, the same reference numbers are used throughout the drawings to refer to the same or like parts.

The invention relates to a depressurization system 10 that is in fluid communication with a high pressure, high temperature fine solid particles stream having entrained gas therein. The system is for use, for example, in processes that have particulate matter that needs to be cooled, depressurized, and/or separated from the fine solid particle stream prior to further use or disposal of the particulate matter. In one exemplary embodiment, the system is intended for use in gasification processes, because, for example, at high pressure and/or high temperature, the discharge of solids directly from the operating system to an atmospheric storage unit is not desired.

In one aspect, illustrated in FIG. 1, the depressurization system 10 comprises a vessel 100 defining an interior vessel cavity 114. The vessel 100 has a vessel inlet 110 that is in selective fluid communication with the high pressure, high temperature fine solid particles stream 20 having entrained gas therein and an upper portion 120 of the interior vessel cavity 114. Optionally, in one aspect, the inlet 110 comprises a valve configured to isolate the system from the high pressure, high temperature fine solid particles stream if such actions are desired. It is understood, however, that it is contemplated that the system can operate without the need for a valve at the inlet or an outlet of the system.

Figure 4:
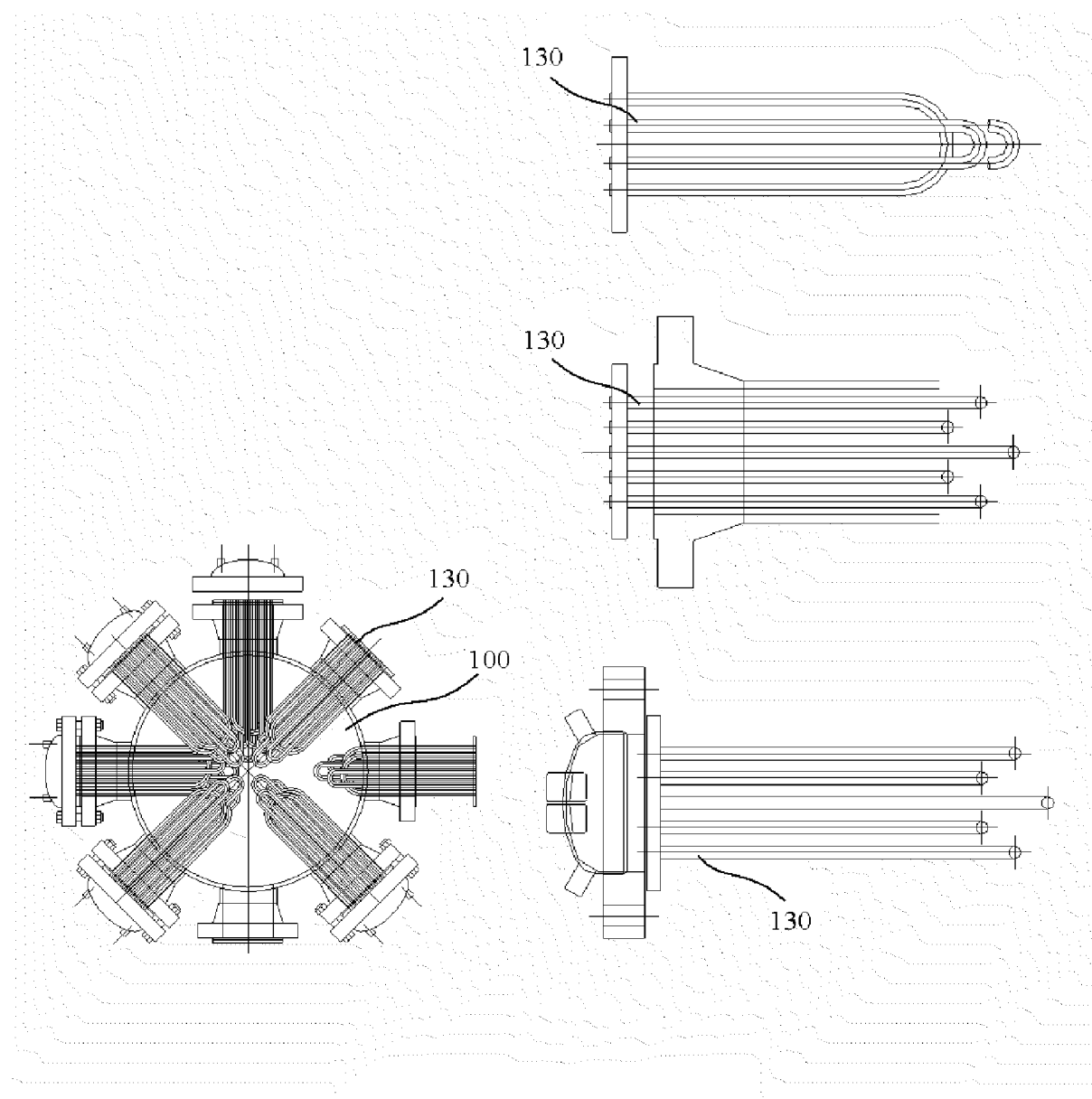
FIG. 4 is a plurality of views of a cooling jacket of the depressurization system of FIG. 1, according to one aspect.
Figure 6:
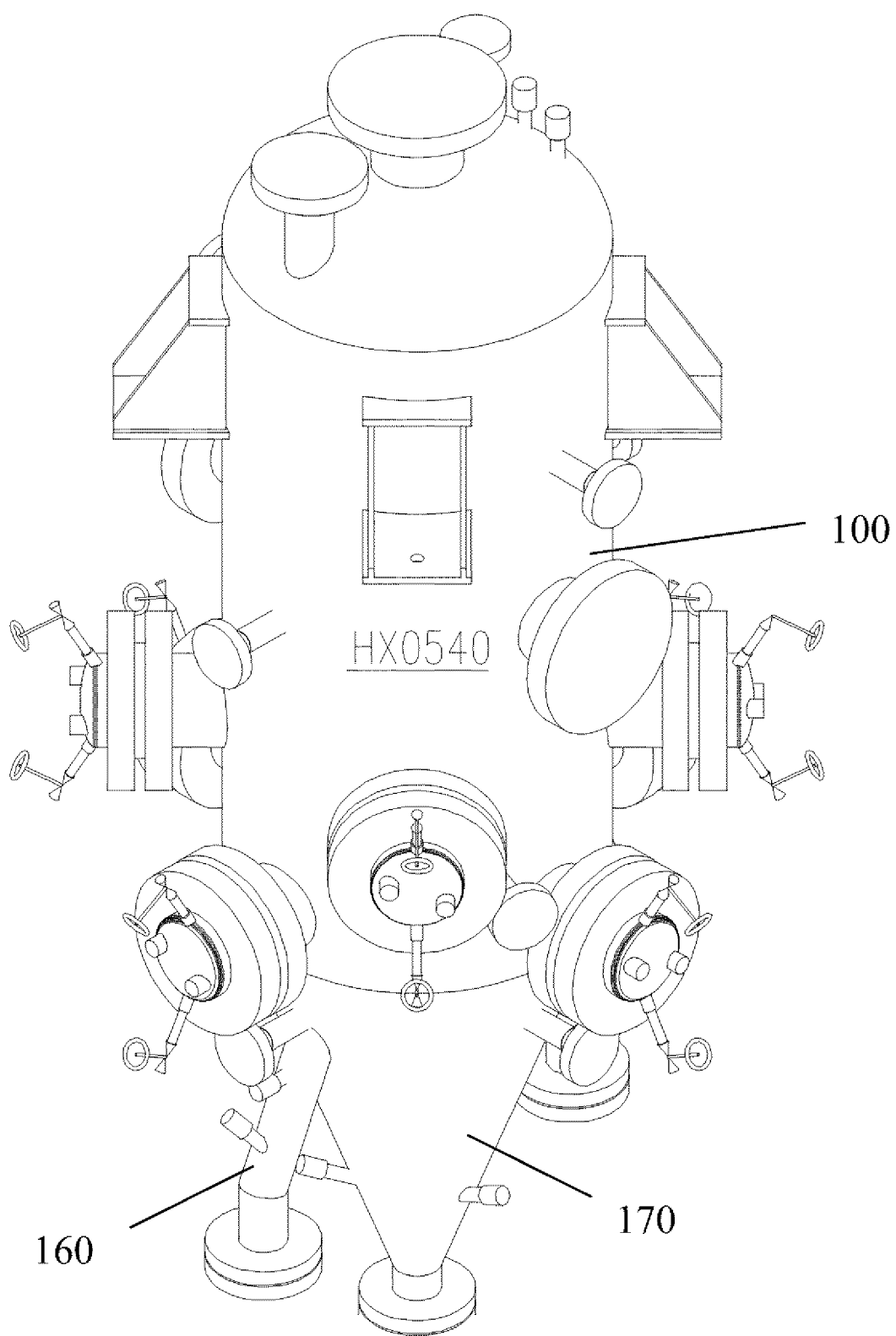
FIG. 6 is a perspective view of one embodiment of a cooling vessel of the depressurization system of FIG. 1.

The vessel 100 is illustrated in FIGS. 1 and 6, according to various aspects. In one aspect, the vessel can cool the high pressure, high temperature fine solid particles stream, as well as the gas entrained therein, to form a high pressure, lower temperature cooled fine solid particles stream 30 having entrained gas therein that is at a substantially uniform temperature. In one aspect, the vessel 100 is equipped with cooling coils within or substantially adjacent the interior vessel cavity, as illustrated in FIG. 4. In another aspect, the vessel comprises a cooling jacket 130 adjacent and substantially surrounding at least a portion of the upper portion 120 of the vessel. As one skilled in the art can appreciate, the cooling jacket 130 may be configured in various conventional ways. For example, and not meant to be limiting, the cooling jacket may comprise a plurality of fluid pathways in fluid communication with a cooling source. In one aspect, the cooling source can comprise a conventional liquid cooling agent or a gas cooling agent. In one exemplary non-limiting example, the liquid cooling agent can comprise water.

Optionally, in one aspect, the vessel 100 also comprises an agitator 140 positioned therein the upper portion 120 of the interior vessel cavity 114 for agitating the gas and fine solid particles while they are in the vessel cavity in order to expose more of the fine solid particles to the source of the cooling, whether it be cooling coils, the cooled outer walls of the vessel, and/or another cooling apparatus. In one aspect, the agitator 140 can comprise mechanical means for agitation, such as a stirrer or similar apparatus. In another aspect, the agitator 140 can be a jet distributor which is in fluid communication with a pressurized fluid source and is configured to distribute the pressurized fluid about the interior vessel cavity. The pressurized fluid can be, for example, nitrogen and/or carbon dioxide, although other fluids are contemplated. In this aspect, the jet distributor comprises a porous medium that is configured to finely distribute the pressurized fluid about the interior vessel cavity 114. The jet distributor, in one aspect, is capable of generating a sonic wave within the interior of the interior vessel cavity to assist in the agitation of the fine solid particles. In another aspect, the cooling jacket 130 and/or the agitator can cool the fine solid particles to a substantially uniform temperature.

In another aspect, the vessel outlet 160 can be defined therein the vessel 100 and can be in fluid communication with a lower portion 170 of the vessel. In still another aspect, the vessel outlet can be configured for egress of the high pressure, lower temperature fine solid particles stream 30 having entrained gas therein. In one aspect, the cooled fine solid particles can be directed through the outlet by gravity and/or the pressure difference from the interior cavity to the outlet.

Figure 2:
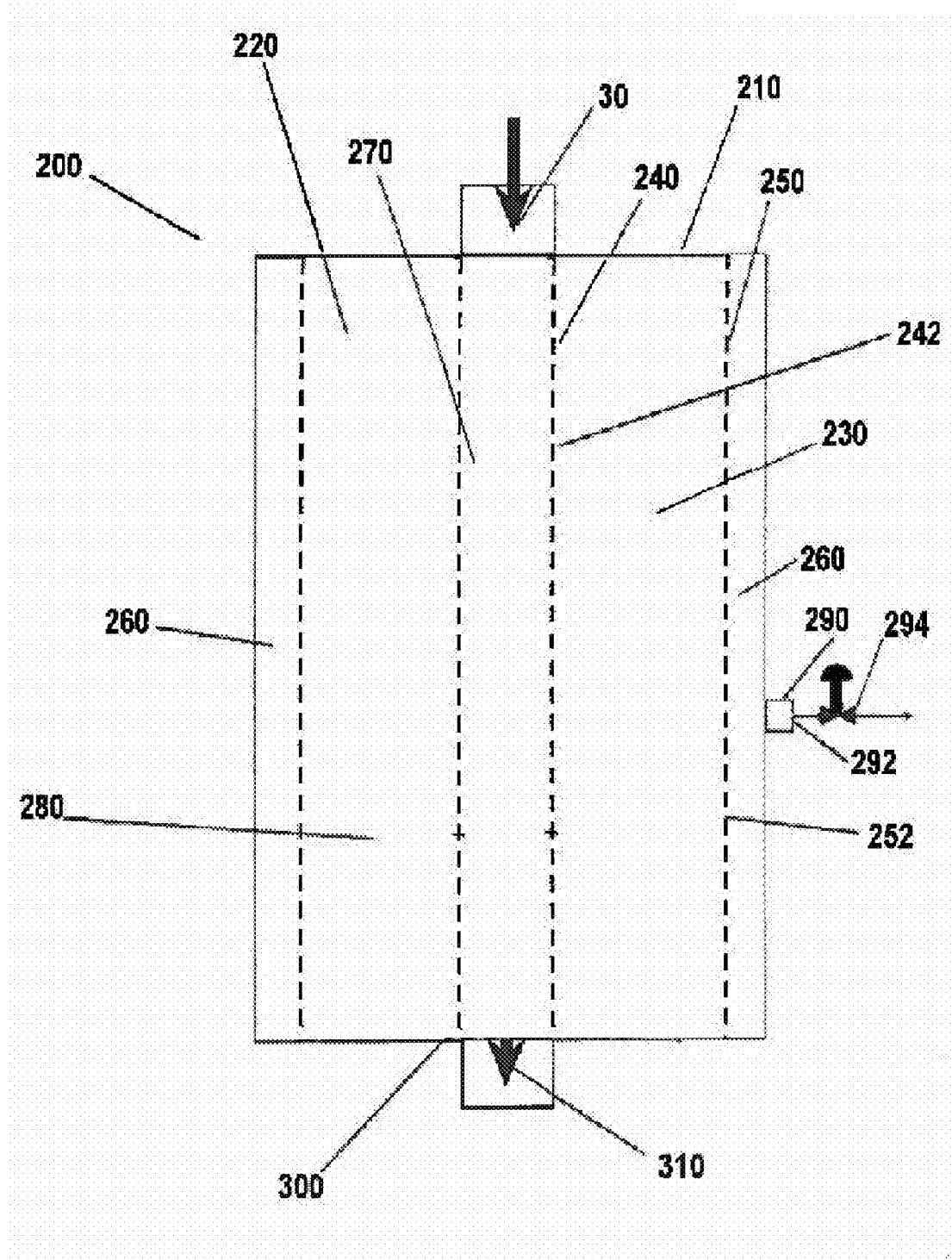
FIG. 2 is a schematic view of one aspect of a pressure letdown device of the depressurization system of FIG. 1.
Figure 3:
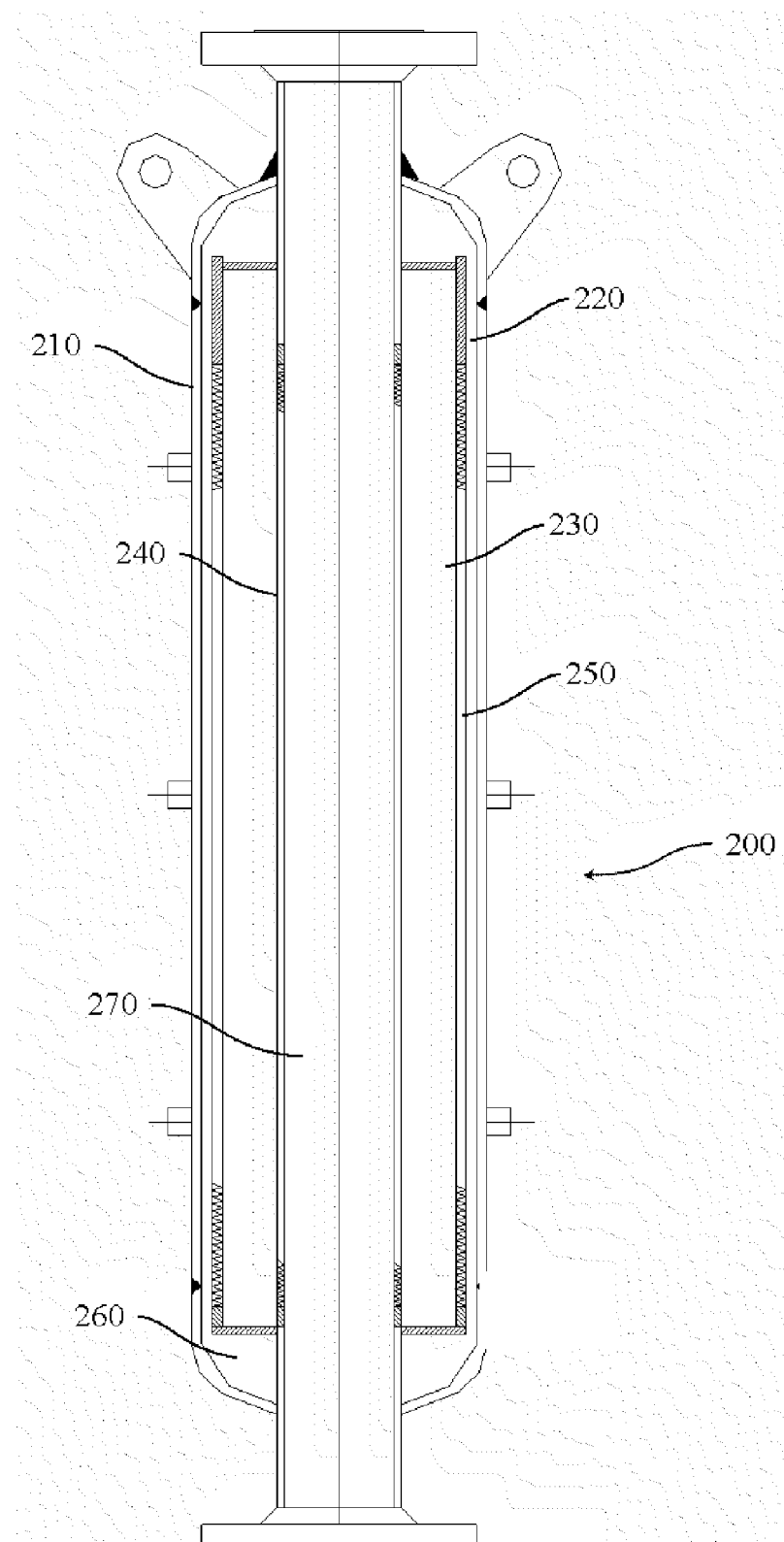
FIG. 3 is a side cross-sectional view of the pressure letdown device of FIG. 2, according to one aspect.

In one aspect, as illustrated in FIGS. 1, 2, and 3, the depressurization system also comprises a pressure letdown device (i.e., a separator) 200 configured for depressurization of the high pressure, lower temperature fine solid particles stream 30 having entrained gas therein by separating the cooled fine solid particles therefrom the entrained gas. In one aspect, the pressure letdown device comprises a housing 210 defining an interior separator cavity 220. In another aspect, disposed within the separator cavity is a granular filter 230 filled with granular particles and having an inner wall 240 and a spaced outer wall 250, the outer wall being spaced therefrom a housing wall and defining an enclosed annulus 260 between the granular filter 230 and the housing wall. The inner wall 240 of the filter defines a conduit 270 in fluid communication with the vessel outlet 160. In one aspect, the inner wall of the filter comprises a first plurality of pores 242 having a first pore diameter that is greater than a mean diameter of the fine solid particles. These pores enable the gas, as well as some of the fine solid particles, to flow therethrough. In another aspect, the outer wall 250 of the filter comprises a second plurality of pores 252 having a pore diameter substantially equal to or greater than the first plurality of pores 242 of the inner wall 240. In this aspect, the inner wall and the outer wall of the filter define an enclosed filtration cavity 280. In another aspect, a bed of granules having a substantially uniform size can be disposed within the filtration cavity. In still another aspect, a capillary diameter of the granular bed can be less than one-fifth of the mean size of the fine solid particles of the high pressure, lower temperature fine solid particles stream 30. In another aspect, a top portion and a bottom portion of the filter can comprise solid plates configured to enclose the filtration cavity and prevent the escape of gas therefrom.

During operation, in one aspect, the high pressure, lower temperature fine solid particles stream can flow through the first plurality of pores 242, through the bed of granules, through the second plurality of pores, and collect in the annulus 260 between the outer wall of the filter and the housing wall. In another aspect, some dust from the fine solid particles can flow through the first plurality or pores and penetrate to a thickness into the bed of granules. In this aspect, the dust can form a layer of fine materials in the granular bed, which can prevent the fine solid particles of the high pressure, lower temperature fine solid particles stream from penetrating deeper into the granular bed. As a result, in this aspect, the bed of granules can rarely need to be cleaned by a reverse flow of gas.

In one aspect of the pressure letdown device 200, the diameter of each pore of the first plurality of pores 242 can be in the range from about 10 to about 200 microns. In another aspect, the diameter or each pore of the second plurality of pores can be in the range from about 10 to about 200 microns. In still another aspect, the diameter of the pores of the first plurality of pores 242 and the second plurality of pores can be selected depending on the size and type of the particles of the fine solid particles stream to be depressurized and on the operating pressure of the depressurization system 10. The granules in the granular bed, in one aspect, can have a mean diameter that is greater than the first and second pore diameters.

Once the gas collected in the annulus 260 reaches a predetermined pressure level, the gas egresses there through the gas outlet 290, as exemplarily illustrated in FIG. 2. The cooled fine solid particles continue through the conduit 270 and exit the pressure letdown device via a solids outlet 310 positioned adjacent a distal end of the conduit 300 at a lower pressure. In one aspect, the gas outlet 290 can be equipped with a pressure control valve 294, although other methods of controlling the release of the gas are contemplated. In another aspect, the diameter of the gas outlet 290 and the size of the pressure control valve 294 can depend on the operating pressure and/or the size of the cooled fine particles in the high pressure, lower temperature cooled fine solid particles stream 30. In still another aspect, the gas egress flow rate through the gas outlet 290 can be a fraction of the gas entrained by the high pressure, lower temperature stream 30. In this aspect, the gas egress flow rate can depend on the flow rate of high pressure, lower temperature stream (corresponding to a desired discharge rate of solid particles) and degree of depressurization. In another aspect, the fraction of the gas that does not egress the pressure letdown device 200 through the gas outlet can be vented out of the pressure letdown device through the solids outlet 310 along with the solids discharge. In another aspect, the set point of the pressure control valve 294 can be the desired low discharge pressure at the solids outlet.

As mentioned herein above, the depressurization system, in one aspect, is part of a larger gasification system and is designed to depressurize, cool, and separate the fine solid particles from the entrained gas. In one aspect, the fine solid particles comprise fly ash from a gasification system.

In an exemplary aspect, the fine solid particles have a mean diameter from about 5 microns to about 40 microns. In another aspect, the fine solid particles have a mean diameter from about 10 microns to about 30 microns. In still another aspect, the fine solid particles can range in size from submicron up to 300 microns.

It is contemplated that this system can operate over a wide range of temperatures and pressures. In one aspect, the high pressure, high temperature fine solid particles stream 20 having entrained gas therein ingresses the interior vessel cavity 114 at a pressure in the range from about 30 psig to about 1000 psig. In another aspect, the high pressure, high temperature fine solid particles stream having entrained gas therein ingresses the interior vessel cavity at a pressure in the range from about 100 psig to about 275 psig. In another aspect, after the high pressure, high temperature fine solid particles stream having entrained gas therein travels through the depressurization system 10, the fine solid particles can egress the solids outlet 310 at a desired pressure in the range from about 0 psig to about 30 psig. In still another aspect, the pressure of fine sold particles at the solids outlet can be sufficiently high to transport the solids to a storage tank or silo.

In one aspect, the high pressure, high temperature fine solid particles stream 20 having entrained gas therein ingresses the interior vessel cavity for cooling at a temperature in the range from about 500° F. to about 1800° F. In another aspect, the high pressure, high temperature fine solid particles stream having entrained gas therein ingresses the interior vessel cavity 114 at a temperature in the range from about 300° F. to about 850° F. In another aspect, after traveling through the depressurization system, the fine solid particles can egress the solids outlet at a desired temperature in the range from about 100° F. to about 350° F. In still another aspect, the exit temperature of the solids at the solids outlet 310 can be designed to suit the disposal needs and/or the tolerance of any downstream equipment. In another aspect, it is contemplated that the pressure letdown device can operate up at temperatures up to 850° F.

In one aspect, the system 10 can be sized so that any flow rate of the high pressure, high temperature fine solid particles stream having entrained gas therein can be input into the system and processed.

In one aspect, wherein the solids flow rate is relatively low, such as for example and without limitation, 1000 lb/hr or less, the rate of egress of solid particles from the solids outlet 310 is controlled by adjusting the pressure at the gas outlet 290. In another aspect, during normal operation, the fine solids level in the pressure letdown device 200 can be maintained by depressurizing and controlling the discharge rate at the solids outlet 310. In still another aspect, the discharge rate at the solids outlet can be controlled by adjusting the pressure set point on the pressure control valve 294 to vary the discharge from relatively low to design rates. In yet another aspect, the solids discharge at the solids outlet 310 can be completely stopped by lowering the pressure at the solids outlet to less than 5 psig, typically, with the pressure control valve 294. In this aspect, the minimum discharge pressure that is necessary at the solids outlet 310 to initiate discharge can depend upon the particle characteristics of the high pressure, lower temperature stream 30. Thus, according to this aspect, it is not necessary for there to be a valve at the solids outlet or in a conveying line in order to control the rate of fine solids flow. In another aspect, the size of the solids discharge line at the solids outlet 310 can have an impact on the rate of egress of the fine solid particles. It is also contemplated that there may be a plurality of solids outlets. In yet another aspect, a conveying gas may be introduced adjacent the solids outlet to assist in the egress of the fine solid particles. In still another aspect, the discharge rate of fine particle sizes can be varied as desired. For example, the discharge rate can be as low as 0 lb/hr. In another aspect, the depressurization system 10 can be designed such that discharge rate can be as high as desired, for example 10,000 lb/hr or more.

Figure 5:
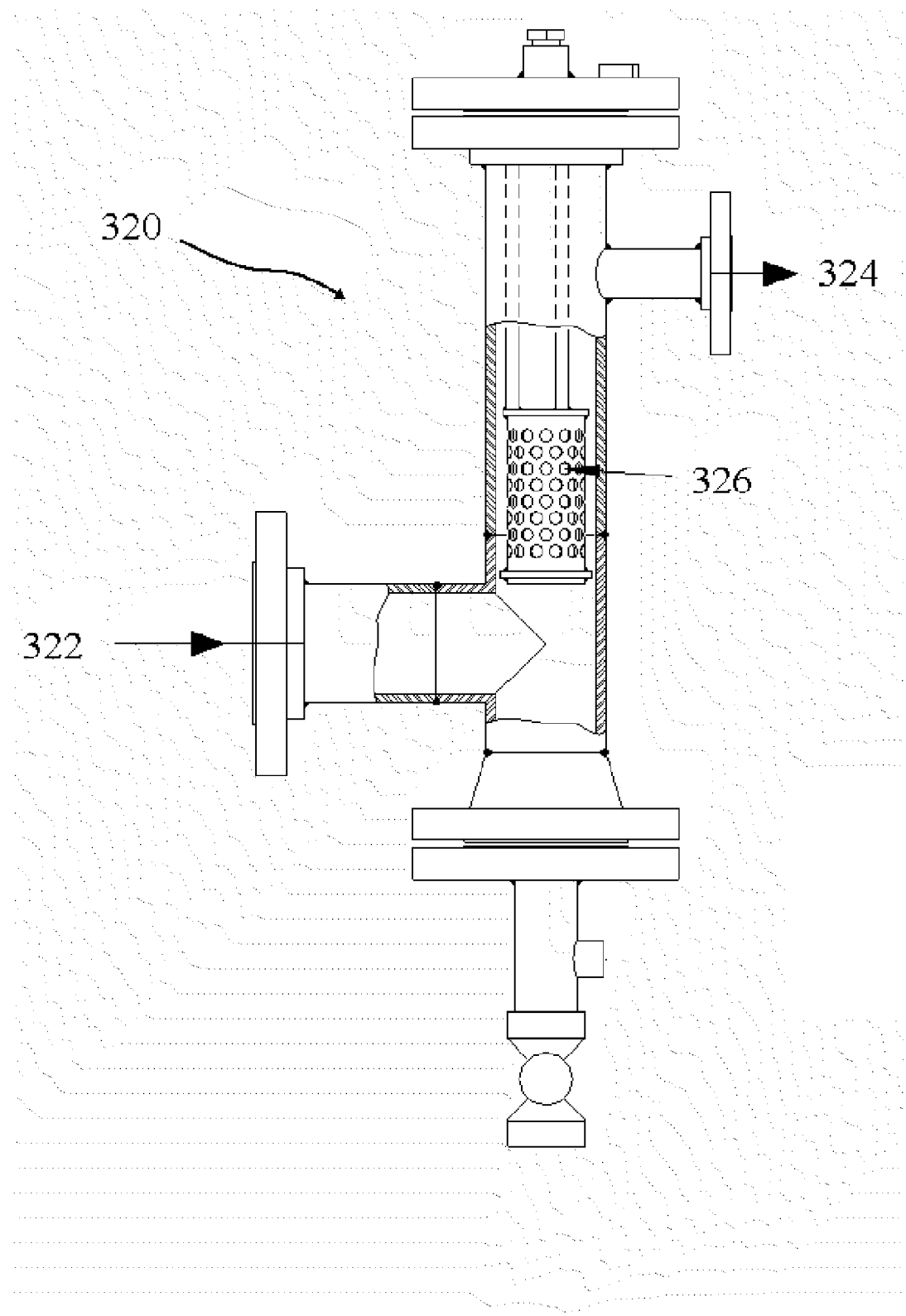
FIG. 5 is a schematic, partially cut-away view of a coarse filter and collection system of the depressurization system of FIG. 1

Additionally, in another aspect, the depressurization system 10 can comprise a collector device 320, as illustrated in FIG. 5, comprising a coarse filter 326 in communication with the solids outlet 310. In one aspect, the collector device can prevent oversized solids and/or extraneous materials from being discharged from the solids outlet and plugging the conveying line. In another aspect, solids exiting the pressure letdown device 200 via the solids outlet 310 can ingress a collector inlet 322. The coarse filter of the collector device can collect oversized solids and/or extraneous materials, removing them from the solids stream for disposal. The remaining solids can exit the collector device via a collector outlet 324 in communication with the conveying line.

In one aspect, should a larger drop in pressure be necessary, it is contemplated that a plurality of pressure letdown devices 200 can be cascaded together in series, each having an outlet capable of removing at least a portion of the gas from the fine solid particles stream having entrained gas therein. In one aspect, for example, in a system with an operating pressure of 450 psig and a solids removal rate of 1000 ft$^3$/hr, there can be 3 or 4 separators in series, each 2 ft to 3 ft long, depending on particle characteristics.

In another aspect, it is contemplated that the plurality of pressure letdown devices can be arranged in parallel. In this aspect, the high pressure, lower temperature solids can be distributed by a plurality of solids inlet conduits to the plurality of pressure letdown devices 200. After depressurization, according to this aspect, the solids can be collected into a single discharge pipe or they can be discharged into a plurality of discharge pipes.

It is contemplated that the depressurization system 10 can be used with typical fine solid particles from gasification, combustion and/or other processes. In one aspect, dry fine hot ash from a particle collection device can be collected in a vessel 100 (buffer tank), where the ash is cooled. In another aspect, after cooling, the ash can flow through a plurality of stages of the pressure letdown device 200 (i.e., a plurality of pressure letdown devices arranged serially, as described above) and depressurized to a conveying line pressure for discharge to an ash silo. For example, ash can be input into the system as described above and cooled down first in a vessel 100. The cooled ash of this example can then be depressurized through multiple stages of pressure letdown devices before being discharged to an ash silo.

The depressurization system 10 can be used to process fine solid particles from industrial applications. The system has been tested within a high pressure gasification facility processing 70 tons of coal per day, with process pressures ranging up to 275 psig input into the vessel 100. Fine solids temperatures have ranged up to 850 degrees Fahrenheit, and particle size has ranged from submicron up to 300 micron. The system has been fully integrated with the gasification process and the system has been successfully operated with fine materials derived from lignite, subbituminous coal and bituminous coal.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed hereinabove, and that many modifications and other embodiments are intended to be included within the scope of the appended claims. Moreover, although specific terms are employed herein, as well as in the claims which follow, they are used only in a generic and descriptive sense, and not for the purposes of limiting the described invention, nor the claims which follow.

The invention claimed is:

1. A depressurization system in fluid communication with a high pressure, high temperature fine solid particles stream having entrained gas therein, the system comprising: a vessel defining an interior vessel cavity that has an upper portion and an opposed lower portion, the vessel comprising: a vessel inlet defined therein the vessel that is in selective fluid communication with the high pressure, high temperature fine solid particles stream having entrained gas therein and the upper portion of the interior vessel cavity; an agitator positioned therein the upper portion of the interior vessel cavity that is configured to mix the fine solid particles within the interior vessel cavity; a means for cooling the high pressure, high temperature fine solid particles stream having entrained gas therein to form a high pressure, lower temperature cooled fine solid particles stream having entrained gas therein that are at a substantially uniform temperature; and a vessel outlet defined therein the vessel that is in fluid communication with the lower portion of the vessel for egress of the high pressure, lower temperature cooled fine solid particles stream having entrained gas therein;

a pressure letdown device for separating the cooled fine solid particles therefrom at least a portion of the high pressure, lower temperature cooled fine solid particles stream having entrained gas therein, comprising:

a housing defining an interior separator cavity and having a housing wall;

a filter disposed within the interior separator cavity and having an inner wall and a spaced outer wall, the outer wall being spaced therefrom the housing wall and defining an enclosed annulus between the filter and the housing wall, wherein the inner wall defines a conduit in fluid communication with the vessel outlet, the inner wall comprising a first plurality of pores having a first pore diameter that is greater than a mean diameter of the fine solid particles, wherein the outer wall comprises a second plurality of pores having a second pore diameter that is less than the mean diameter of the fine solid particles, wherein the inner wall and the outer wall of the filter define an enclosed filtration cavity;

a bed of granules disposed therein the filtration cavity, and a gas outlet in selective fluid communication with the annulus for egress of the pressurized gas;

wherein at least a portion of the cooled fine solid particles exit the separator via a solids outlet that is positioned adjacent a distal end of the conduit.

2. The depressurization system of claim 1, wherein the first pore diameter is in the range from about 10 microns to about 200 microns.

3. The depressurization system of claim 2, wherein the second pore diameter is in the range from about 10 microns to about 200 microns.

4. The depressurization system of claim 1, wherein the granules have a mean diameter that is greater than the first and second pore diameters.

5. The depressurization system of claim 1, wherein the gas outlet comprises a pressure control valve.

6. The depressurization system of claim 1, wherein the means for cooling the fine solid particles and gas from the high pressure, high temperature fine solid particles stream having entrained gas therein comprises a cooling jacket adjacent and substantially surrounding at least a portion of the upper portion of the vessel.

7. The depressurization system of claim 1, wherein the agitator is in fluid communication with a pressurized fluid source and is configured to distribute the pressurized fluid about the interior vessel cavity.

8. The depressurization system of claim 7, wherein the agitator comprises a porous medium that is configured to finely distribute the pressurized fluid about the interior vessel cavity.

9. The depressurization system of claim 7 wherein the agitator comprises a means to generate at least one sonic wave therein the interior vessel cavity.

10. The depressurization system of claim 7, wherein the pressurized fluid comprises nitrogen.

11. The depressurization system of claim 1, wherein the fine solid particles comprise fly ash from a gasification system.

12. The depressurization system of claim 1, wherein the fine solid particles have a mean diameter from about 5 microns to about 40 microns.

13. The depressurization system of claim 1, wherein the high pressure, high temperature fine solid particles stream having entrained gas therein ingresses the interior vessel cavity at a pressure in the range from about 30 psig to about 1000 psig.

14. The depressurization system of claim 13, wherein the fine solid particles egress the solids outlet at a pressure in the range from about 0 psig to about 30 psig.

15. The depressurization system of claim 1, wherein the high pressure, high temperature fine solid particles stream having entrained gas therein ingresses the interior vessel cavity at a temperature in the range from about 100 degrees Fahrenheit to about 850 degrees Fahrenheit.

16. The depressurization system of claim 15, wherein the fine solid particles egress the solids outlet at a temperature in the range from about 100 degrees Fahrenheit to about 350 degrees Fahrenheit.

17. The depressurization system of claim 1, wherein the pressure letdown device comprises a plurality of pressure letdown devices in series with one another.

18. The depressurization system of claim 1, wherein the flow rate of fine solid particles into the vessel is in the range from about 0 lb./hour to about 10,000 lb./hour.

19. The depressurization system of claim 1, further comprising a collector device in communication with the solids outlet of the pressure letdown device configured for collecting oversized particles discharged from the solids outlet.

20. The depressurization system of claim 19, wherein the collector device comprises a coarse filter.

21. A depressurization system in fluid communication with a high pressure, high temperature fine solid particles stream having entrained gas therein, the system comprising:
 a means for cooling the high pressure, high temperature fine solid particles stream having entrained gas therein resulting in a high pressure, lower temperature cooled fine solid particles stream having entrained gas therein;
 a separator for separating the cooled fine solid particles therefrom at least a portion of the high pressure, lower temperature fine solid particles stream having entrained gas therein, comprising:
  a housing defining an interior separator cavity and having a housing wall;
  a filter disposed within the interior separator cavity and having an inner wall and a spaced outer wall, the outer wall being spaced therefrom the housing wall and defining an enclosed annulus between the filter and the housing wall, wherein the inner wall defines a conduit in fluid communication with the high pressure, lower temperature cooled fine solid particles stream having entrained gas therein, the inner wall comprising a first plurality of pores having a first pore diameter that is greater than a mean diameter of the fine solid particles, wherein the outer wall comprises a second plurality of pores having a second pore diameter that is less than the mean diameter of the fine solid particles, wherein the inner wall and the outer wall of the filter define an enclosed filtration cavity;
  a bed of granules disposed therein the filtration cavity, and
  a gas outlet in selective fluid communication with the annulus for egress of the pressurized gas;
 wherein at least a portion of the cooled fine solid particles exit the pressure letdown device via a solids outlet positioned adjacent a distal end of the conduit.

* * * * *